United States Patent
Lefebvre et al.

(10) Patent No.: US 8,103,050 B2
(45) Date of Patent: Jan. 24, 2012

(54) METHOD FOR COMPUTING A FINGERPRINT OF A VIDEO SEQUENCE

(75) Inventors: Frederic Lefebvre, Rennes (FR); Claire-Helene Demarty, La Meziere (FR); Lionel Oisel, La Nouaye (FR); Ayoub Massoudi, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 860 days.

(21) Appl. No.: 12/087,831

(22) PCT Filed: Jan. 16, 2007

(86) PCT No.: PCT/EP2007/000334
§ 371 (c)(1),
(2), (4) Date: Jul. 16, 2008

(87) PCT Pub. No.: WO2007/080133
PCT Pub. Date: Jul. 19, 2007

(65) Prior Publication Data
US 2008/0317278 A1    Dec. 25, 2008

(30) Foreign Application Priority Data
Jan. 16, 2006   (EP) .................................... 06290100

(51) Int. Cl.
*G06K 9/00*     (2006.01)
*H04H 60/32*    (2008.01)

(52) U.S. Cl. ........................................ 382/100; 725/19
(58) Field of Classification Search .................. 382/100, 382/190; 725/19, 32; 707/711, 737, 741, 707/752
See application file for complete search history.

(56) References Cited

U.S. PATENT DOCUMENTS
| 6,393,054 B1 | 5/2002 | Altunbasak et al. |
| 2004/0128512 A1 | 7/2004 | Sharma et al. |
| 2005/0238324 A1 | 10/2005 | Kitani et al. |

FOREIGN PATENT DOCUMENTS
| WO | WO 99/51022 | 10/1999 |
| WO | WO 02/37331 | 5/2002 |
| WO | WO 2006/059053 | 6/2006 |

OTHER PUBLICATIONS
Search Report Dated Sep. 20, 2007.

*Primary Examiner* — John Strege
(74) *Attorney, Agent, or Firm* — Robert D. Shedd; Harvey D. Fried; James McKenzie

(57) ABSTRACT

The invention concerns a method for computing a fingerprint of a video sequence. The method comprises the steps of—Computation of a visual digest for each frame of the video, —Computation of the distance between the visual digest of each frame of the video in order to detect shots, —Detection, for each detected shot of the video, of a frame, called stable frame, having the smallest content variation of the shot, —Calculation of a local fingerprint for said stable frame.

11 Claims, 4 Drawing Sheets

Orientation of the keypoint *(x,y)*

METHOD FOR COMPUTING A FINGERPRINT OF A VIDEO SEQUENCE

Figure 1:
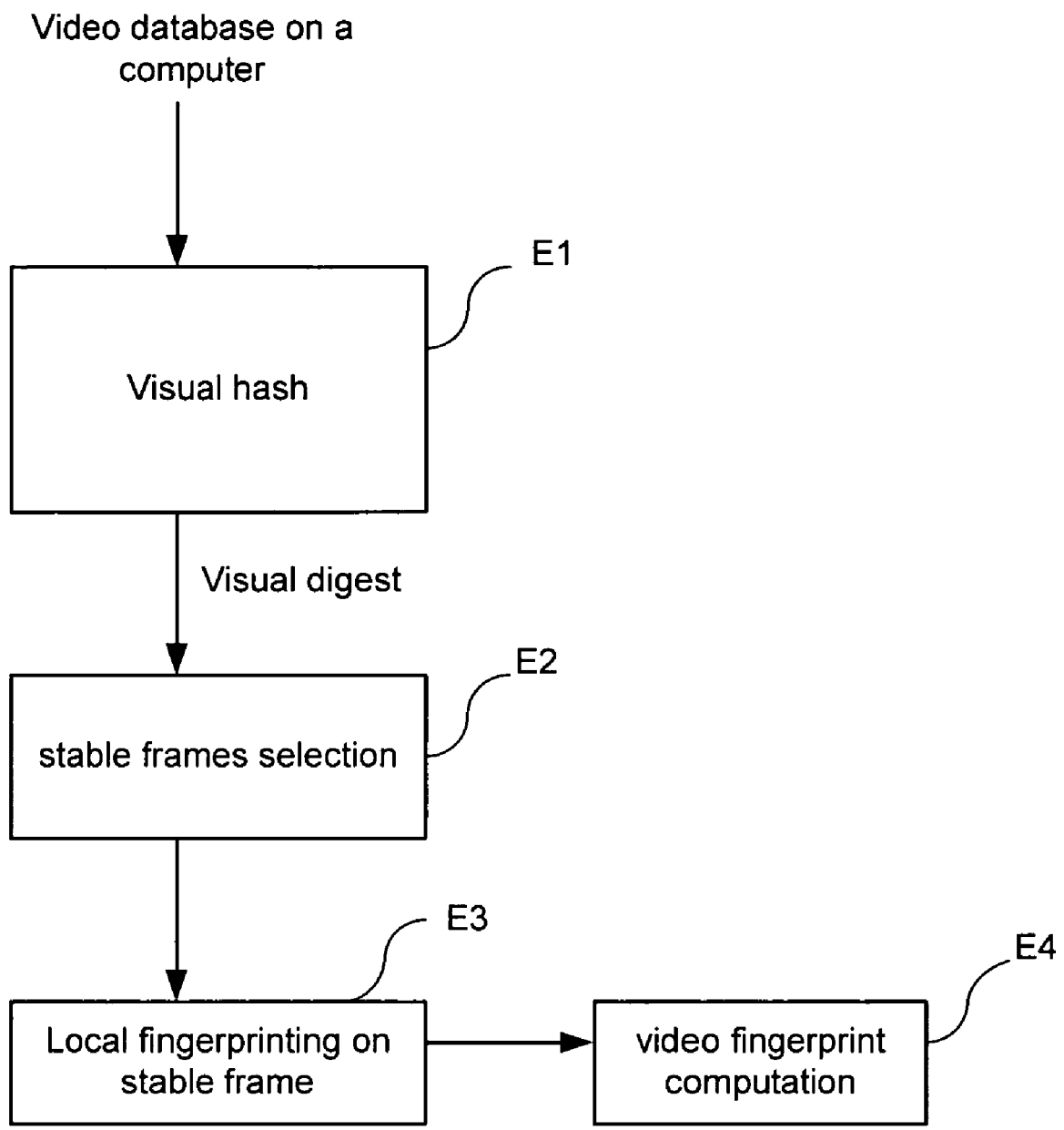

This application claims the benefit, under 35 U.S.C. §365 of International Application PCT/EP07/000334, filed Jan. 16, 2007, which was published in accordance with PCT Article 21(2) on Jul. 19, 2007 in English and which claims the benefit of European patent applications No. 06290100.4, filed Jan. 16, 2006.

The invention concerns a method for computing a fingerprint of a video sequence.

The invention concerns mainly the field of content identification and authentication.

New multimedia database search tools require rapidity, editing, resistance and copyright enforcement/protection. Fingerprinting is largely used to search image/video content in large multimedia databases. A fingerprinting design extracts discriminating features, called fingerprints, typical for each image/video and thus specific to each image/video. The fingerprint can also be called image DNA or video DNA.

The main application is image/video copy detection and/or monitoring. Security and output bit length are the fingerprinting weaknesses.

The visual hash is a fingerprinting technique with cryptosystem constraints. A visual hash function computes a unique, constant bit length, condensed version of the content, called also visual digest. A small change of the image/video leads to a small change of the visual digest. Visual hash is used in multimedia content authentication.

None of the known techniques combine efficient key frame detection (shot boundaries, stable frames) and efficient key frame description.

One aim of the invention is to propose a video fingerprinting process which combines visual hash and local fingerprinting.

To this end, the invention concerns a method for computing a fingerprint of a video sequence. According to the invention, the method comprises the steps of
  Computation of a visual digest for each frame of the video,
  Computation of the distance between the visual digest of each frame of the video in order to detect shots,
  Detection, for each detected shot of the video, of a frame, called stable frame, having the smallest content variation of the shot,
  Calculation of a local fingerprint for said stable frame.

The proposed fingerprint can be resistant against temporal cropping, spatial cropping, change of frame rate, geometrical manipulations (scaling, rotation), luminance changes . . . The video fingerprint is easy to compute (time demanding context) and collision resistant.

According to a preferred embodiment, the computation of a visual digest for each frame is based on the computation of a visual hash function.

The invention proposes an innovative video content identification process which combines a visual hash function and a local fingerprinting. Thanks to a visual hash function, one can observe the video content variation and detect key frames. A local image fingerprint technique characterizes the detected key frames. The set of local fingerprints computed on key frames for the whole video summarizes the video or fragments of the video.

According to a preferred embodiment, the said visual hash function comprises the sub-steps of
  selection of a set of pixels, said set of pixels being the pixels belonging to the ellipse of maximum size centered in the center of the frame comprised in said frame,
  calculation of a visual digest for each angular orientation ($\theta$) from 0 to 179 degrees,
  the global visual digest of said frame being the set of all the visual digests of the different angular orientations.

Preferentially, the visual digest for one orientation is based on the luminance of the pixels in the strip of said orientation.

Advantageously, the step of detecting the shots comprise the sub-steps of:
  defining a pseudo-global threshold for each frame, computed on a large sliding window centered on said frame based on the mean and on the variance of the distance between said frame (i) and the frames in said window,
  defining a local and adaptive threshold for each frame, computed on a small sliding window centered on said frame (i), based on the second maximum value of the distance between two frames in said window.

Preferentially, the shots are defined as being the frames which distance with their neighbor frame is lower than the maximum of the said two thresholds.

According to a preferred embodiment, the step of detection of a stable frame comprises the sub-steps of:
  computing, for each frame of each shot, an average of the content image distance defined in an interval comprising a predetermined number of frames (2 L3+1),
  determining the stable frame as being the frame verifying the following conditions:
    the said calculated distance is the minimum of the calculated distance
    the entropy of the visual digest of said frame is higher than a predetermined threshold.

Preferentially, the step of calculation of a local fingerprint for said stable frame comprises the sub-steps of
  detection of a set of interest points in said frame, said interest points being detected by applying a difference of Gaussian of successive filtered frames,
  Computation of a descriptor for each of the interest points.

In an advantageous manner, the computation of a descriptor comprises the following sub-steps
  determining the gradient of each interest point orientation in a small disc around the interest point, by computing its magnitude and its orientation,
  division into nine regions of a circle centered around each interest point;
  computation for each region of a local histogram of the gradients orientation,
  the set of each local histogram representing the descriptor of each interest point.

Preferentially, the local fingerprint of a stable frame is the set of the descriptors of all the interest points of said stable frame.

According to a preferred embodiment, the video fingerprint is the set of the local fingerprints of all the stable frames.

Other characteristics and advantages of the invention will appear through the description of a non-limiting embodiment of the invention, which will be illustrated, with the help of the enclosed drawings.

Figure 2:
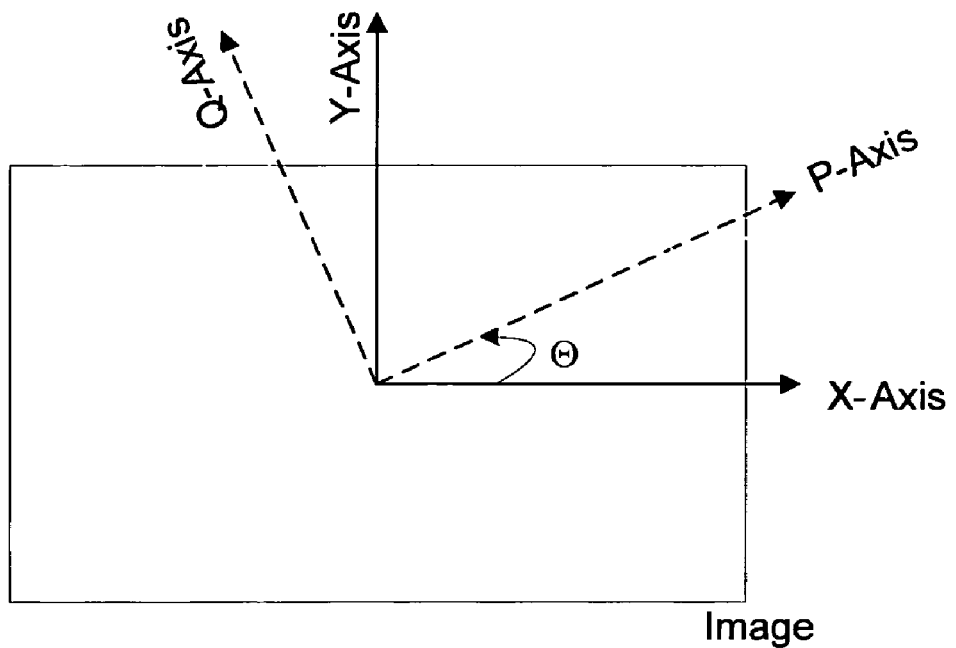
Figure 3:
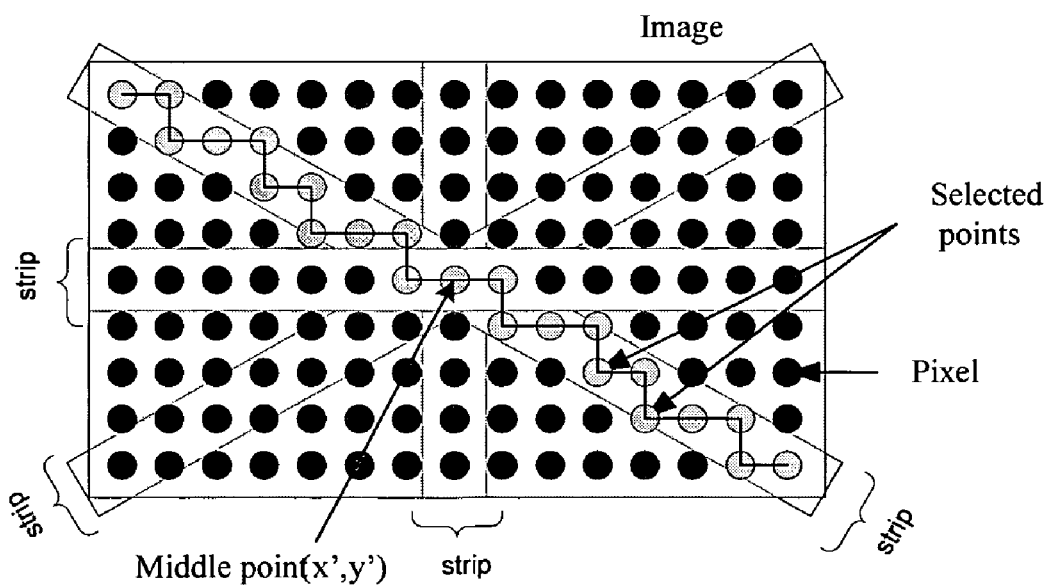
Figure 4:
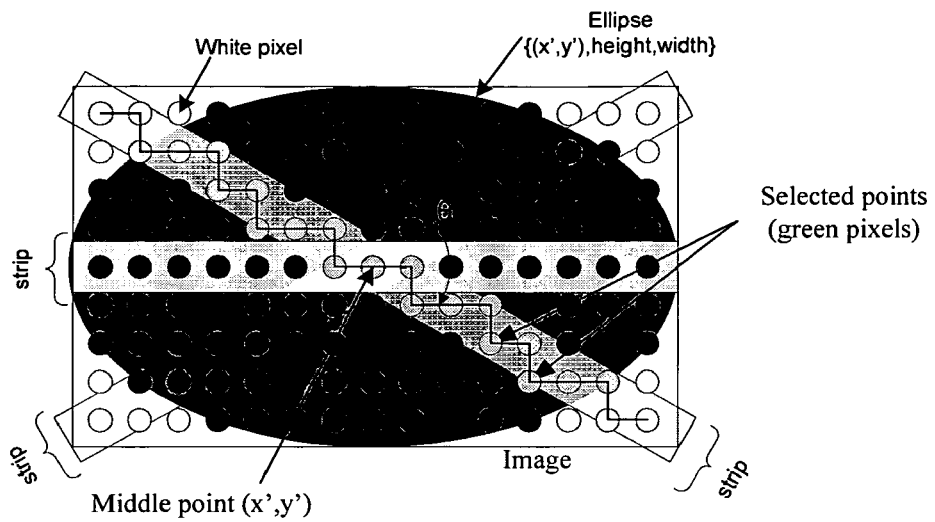
Figure 5:
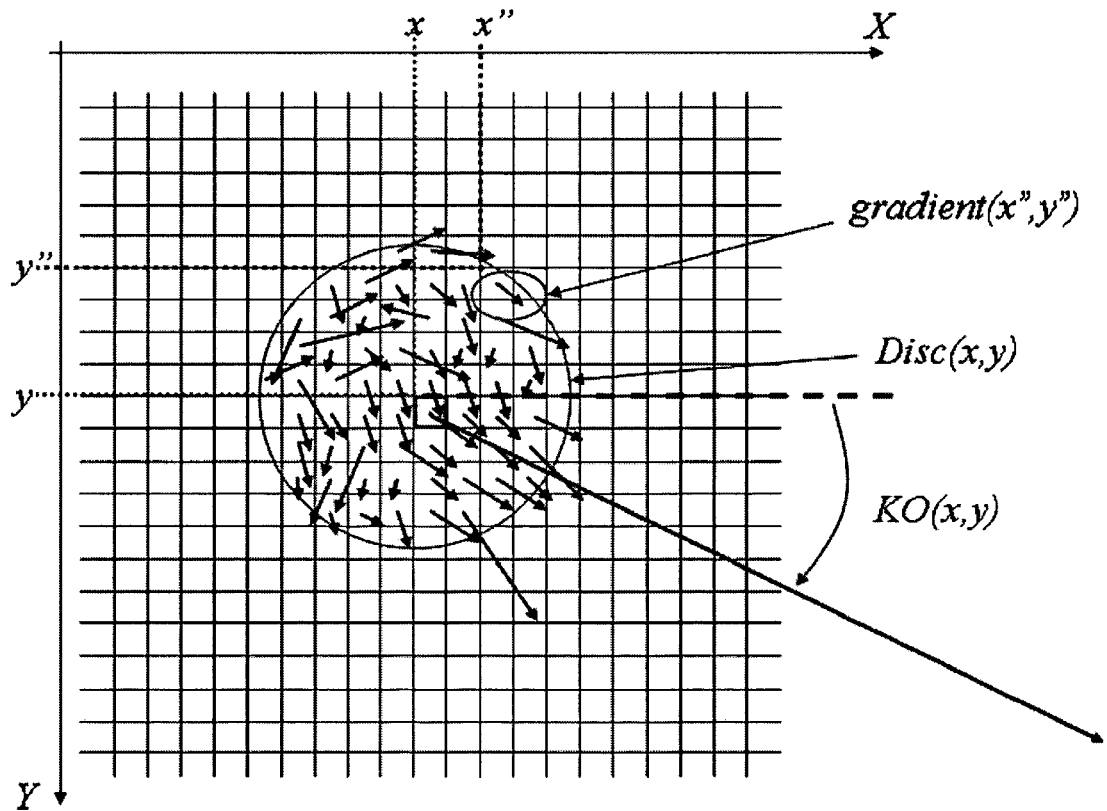
Figure 6:
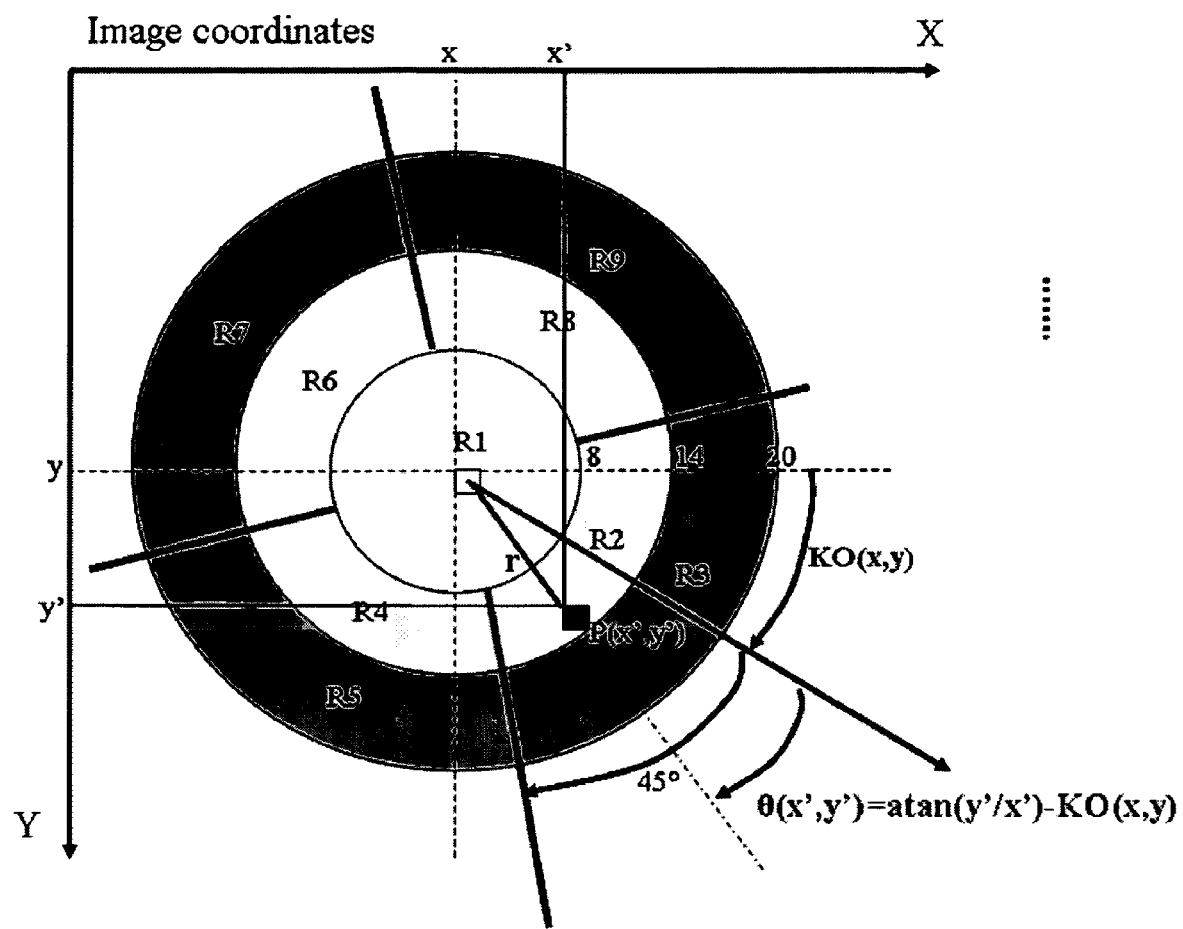

FIG. 1 represents a global overview of the method according to the best mode of realization of the invention, FIG. 2 represents an image in the polar referential, FIG. 3 represents a selection of points in an image used for the computation of the visual digest, FIG. 4 represents a selection of preferred points in an image for the computation of the visual digest, FIG. 5 represents a key point orientation used for local fingerprint computing, FIG. 6 represents a nine region decomposition used for the computation of the descriptor.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware component that contain hardwired logic for performing the steps, or by any combination of programmed computer components and custom hardware components.

Thus, a machine-readable medium may include any mechanism for storing or transmitting information in a form readable by a machine (for instance a computer). These mechanisms include, but are not limited to, floppy diskettes, optical disks, hard disk drives, holographic disks, compact disks read-only memory (CD-ROMs), magneto-optical disks, read-only memory (ROMs), random access memory (RAM), Erasable Programmable Read-only memory (EE-PROM), magnetic or optical cards, flash memory, a transmission over the Internet, electrical, optical, acoustical or other forms of propagated signals (for instance carrier waves, infra-red signals, digital signals, etc), or the like.

Unless specifically stated otherwise as apparent from the following discussion, it is appreciated that discussions utilizing terms such as "processing" or "computing" or "calculating" or "determining" or the like, may refer to the action and processes of a computer system, or similar electronic computing device, that manipulates and transforms data represented as physical quantities within the computer system memories or registers or other such information storage, transmission or display devices.

In the following detailed description of the embodiments, reference is made to the accompanying drawings that show, by way of illustration, specific embodiments in which the invention may be practices. In the drawings, like numeral describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments.

This invention can be used for many purposes.

A first application is to retrieve a video or a fragment of video in a database using video fingerprint as a database index.

A second application is to identify, in real time (or closed to), a video stream by matching the current fingerprints of the current video with all fingerprints of a video database even if strong distortions are applied to an original content. It is a copy detection application.

A third application is to find a model of distortion applied to an original movie. By matching the local fingerprints of an original copy and a pirate copy, a model of distortion is computed. It is a co-registration application. This co-registration technique can be used in an informed watermarking algorithm.

Of course this is a non-limiting list of applications of the invention and other applications can be envisaged.

On FIG. 1, a video database is located on a computer. Such database comprises a set of video images. The described embodiment of the invention proposes to compute for each video of this database, or at least for a selected number of videos, a video fingerprint.

Each video comprises a set of frames for which a fingerprint is to be calculated. During a step E1, a visual hash function is applied on each of the video frames.

A hash function, used in signature generation, computes a unique condensed version of data, a bit stream summary, called message digest. What is called visual hash function is a perceptual hash function designed for images and video contents. Visual hash function uses fingerprinting techniques with crypto-system constraints. A visual hash function verifies:

Easy to compute

A one-way function or cryptographic hash function f has the property "ease of computation": for every input x (from domain of f) f(x) is 'easy' to compute.

Fixed output bit length

A hash function f maps an input x of arbitrary bit length to an output f(x) of fixed bit length.

Pre-image resistant

Given any image y, for which there exists an x with f(x)=y, it is computationally infeasible to compute any pre-image x' with f(x)=y.

Weak collision resistance

Given any pre-image x it is computationally infeasible to find a 2nd pre-image $x' \neq x$ with f(x)=f(x). Two pre-images x, x' are different if and only if their contents are different.

A soft (perceptive) digest

The image f(x) must be resistant and robust, i.e. shall remain the same before and after attacks, if these attacks do not alter the perceptive content. $f(x) \approx f(x')$ if $x \approx x'$. $x \approx x'$ means that x' is a version of x (same visual content).

For image/video application, the image f(x) is called visual digest. A small change of a content leads to a small change of the visual digest. A high change of the content leads to a high change of the visual digest.

An image visual digest can be:

A global digest of the image.

A set of local digests computed on regions of an image.

A video visual digest can be:

a global digest of the video.

a set of image visual digests of all video frames.

a set of image visual digests of all video key frames.

When the visual digest of each of the frames of the video is obtained, a set of key frames is obtained, the key frames being the shot boundaries and the stable frames. The stable frames are frames with the smallest content variation along a shot. For such a frame, the content distance between this frame and its neighbor frames is very low.

Then, a local fingerprint is calculated on each of the stable frames of the video. This local fingerprint represents the fingerprint of the shot the frame belongs to. A set of video fingerprints is thus calculated as the set of the fingerprints of the detected shots of the video.

Step E1: Visual digest construction by the hash function:

The visual digest is based on pseudo variance of the luminance of the points selected on a polar frame representation. On FIG. 2, to select a point in polar frame representation, one considers points along a line passing through the image center, and characterized by its angular orientation θ. For an angular orientation θ, the coordinates of a point (x,y) accord ing to (X,Y) axis (original domain) becomes (p, θ) according to the (P,Q) axis:

$$\begin{bmatrix} p \\ q \end{bmatrix} = \begin{bmatrix} \cos\theta & \sin\theta \\ -\sin\theta & \cos\theta \end{bmatrix} \cdot \begin{bmatrix} x \\ y \end{bmatrix}$$

The set of points on a line passing through the image center, with the orientation θ, are selected. On FIG. 3, this set of points is represented by the pixels which are chained. The discrete version of this line is a strip depicted on FIG. 3. θ ranges from 0 to 179 degrees.

Only the p-axis is used to characterize the pixels of each angular orientation θ. For an angular orientation θ, a point (x,y) is characterized by the couple (p,θ).

For a strip width of 1, a point (x,y) is a selected point if its coordinate p satisfies:

$$-0.5 \leq p - p' \leq 0.5 \quad (1)$$

With (p',θ) the coordinates of the middle point (x',y') for a same given θ.

So the equation (1) becomes:

$$-0.5 \leq (x-x')\cos\theta + (y-y')\sin\theta \leq 0.5 \quad (2)$$

For a strip width of η, we extend (2) to:

$$-\eta/2 \leq (x-x')\cos\theta + (y-y')\sin\theta \leq \eta/2 \quad (3)$$

The preferred embodiment takes care of the importance of a point in the image. The importance of a point (x,y) in an image can be weighted by the relative position of this point (x,y) to the center (x',y'). The distance r of a point (x,y) from the ellipse (FIG. 4) image center (x',y') verifies:

$$r(x, y) < d(\theta) \quad (4)$$

Where:

$$d^2(\theta) = \frac{(\text{height}/2)^2 \cdot (\text{width}/2)^2}{(\text{height}/2)^2 \cdot \cos^2(\theta) + (\text{width}/2)^2 \cdot \sin^2(\theta)}$$

$$r^2(x, y) = (x - x')^2 + (y - y')^2$$

Only pixels belonging to the ellipses are selected among the pixels previously selected. The characteristics of the ellipse are its width and its height, which are the width and height of the frame. The equation of the ellipse being $$\frac{x^2}{a^2} + \frac{y^2}{b^2} = 1$$

With $a = \frac{\text{width}}{2}$ and $b = \frac{\text{height}}{2}$

If a discretization of 1° angle is selected, the visual digest is composed of 180 elements. Each element of the visual digest is thus computed by:

$$Elt(\theta) = \frac{1}{N_\theta} \cdot \sum_{p=1}^{N_\theta} (I(p, \theta) - \text{Mean}(\theta)))^2$$

I(p,θ) is the value of the selected point (p,θ) (for example the luminance of the pixel (p,θ))
Mean(θ) is the classical mean value of I(p,θ)

$$\frac{1}{N_\theta} \cdot \sum_{p=1}^{N_\theta} I(p, \theta).$$

$N_\theta$ is card({p,θ}) (number of pixels in the strip)

The image visual digest of a frame i is:

$$VD(i) = \{Elt(\theta)\}_{\theta=0 \ldots 179}$$

With card(VD(i))=180

In a step E2, the stable frames are detected.

The evolution of the visual digest distance over a group of frames allows the detection of key frames. A shot boundary is a brutal variation of the visual digest inside a group of frames. The set of frames between two shot boundaries is called a shot. The stable frame presents the smallest distance variation of visual digest inside a shot. The goal of this step is to extract stable frames. When a stable frame is detected, it can characterized by using local fingerprinting.

First of all, during this step, a shot boundary detection is performed.

An automatic threshold process determines brutal transitions along the video and detects shot boundaries. The global automatic threshold process is based on two thresholds:
Pseudo-global threshold, denoted $T_{global}$
Adaptive threshold, denoted $T_{local}$ Two frames with the same content have the same (or closed to) visual hash. Instead of the histogram, the visual hash function described previously is chosen to study the video content variation. Such an approach presents the additional advantage to be very fast and not CPU/memory demanding, in addition is the proposed visual digest more sensitive to small change thus more accurate. Thus, the visual digest distance measures the similarity between frames. Inside a window S, the shot boundary corresponds to the frame where a peak of the visual digest variation is detected. This frame is localized in the center of the window S. The shot boundary on a window S, denoted SB, is calculated as below:

$$SB = i | \text{dist}(VD(i), VD(i+1)) > \max(T_{global}(i, L_1), T_{local}(i, L_2))$$

And the set of shot boundaries along a video is denoted ShotBound

ShotBound={SB}

The cardinality of ShotBound depends on video activity.

The visual hash variation is very sensitive to noise and therefore one shot can comprise several non significant peaks. It is therefore necessary to filter these peaks in order to keep only significant maxima.

A first window S1 (the biggest compared to a second one S2) is used to analyze the activity distribution around a central point. S2 is much smaller and avoids having a second peak close to the first peak.

A pseudo-global threshold, denoted $T_{global}(i, L_1)$, is defined on a large sliding window S1 of size 2 $L_1$+1, centered on frame i. Letting p(i) and σ(i) denote the mean and the variance of dist(VD(k),VD(k+1)) measured for all k in $S_1$=[i−$L_1$; i+$L_1$]. We define our proposed pseudo-global threshold as:

$$T_{global}(i, L_1) = \mu(i) + \alpha_1 \cdot \sigma(i)$$

A local and adaptive threshold, denoted $T_{local}(i, L_2)$, is computed on a small sliding window $S_2$ of size 2 $L_2$+1, with $L_2 \ll L_1$, centered on frame i. Specifically, we have:

$$T_{local}(i, L_2) = \alpha_2 \cdot d_{max}(i)$$

where $d_{max}(i)$ is the second maximum value of dist(VD(k), VD(k+1)) measured for k in $S_2$=[i-$L_2$; i+$L_2$].

In the preferred embodiment, $L_1$=20, $L_2$=12, $\alpha_1$=3 and $\alpha_2$=2.

Once the shot boundary is done, the stable frames are detected.

A stable frame is the frame with the smallest content variation along a shot. For such a frame, the content distance between this frame and the neighbor frames is very low. Two frames with the same content have the same (or closed to) visual hash (global fingerprint in our case).

Inside a shot, for each group of 2 $L_3+1$ frames, an average of the content image distance (at the position j) is given by:

$$Dist(j) = \frac{1}{2L_3+1} \cdot \sum_{i=j-L_3, i \in Shot, i \neq j}^{j+L_3} dist(VD(j), VD(i))$$

The stable frame is the frame which provides the smallest average of content image distance within a shot. This stable frame must have well distributed content information.

$$StableFrame = l \begin{vmatrix} Dist(l) = \text{Min}(\{Dist\}) \\ |Entropy(VD(l))| \geq \text{Threshold} \end{vmatrix}$$

We obtain one stable frame per shot.

The preferred value for $L_3$ is 5.

In a step E3, a local fingerprint is computed for each of the detected stable frames.

The local fingerprint process is divided in two steps:
Interest points detection
Local description of interest points
Interest Points Detection The interest points detection is based on a Difference Of Gaussian. It consists in detecting repeatable key points. A key point is repeatable if its pixel location is stable. It must be resistant to scale change, rotation, filtering . . . A cascade of filtered images is used. The Gaussian kernel is a scale-space kernel candidate. The theoretical interest of such an approach is that the difference of two Gaussians with respective variances $k \cdot \sigma$ and $\sigma$ is a very good approximation of the normalized Gaussian Laplacian:

$$G(x,y,k\sigma)-G(x,y,\sigma) \approx (k-1)\sigma^2 \nabla^2 G \quad (5)$$

The convolution of (5) with the image leads to the Difference of Gaussians function (DOG image):

$$D(x,y,\sigma)=(G(x,y,k\sigma)-G(x,y,\sigma))*I(x,y) \quad (6)$$

$D(x,y,\sigma)$ represents the DOG function;

$I(x,y)$ represents the luminance of pixels of coordinates (x,y).

Therefore, for an input image, cascades of filtered images are built that are called "octaves", and then the difference of Gaussians for each octave is computed. The extrema of the DOGs Gaussians represent potential locations of interest points. Not all of these locations contain relevant information. Thus, a further threshold is performed on these points. Only the points with good contrast and precise space localization are kept. The locations of the detected key points in the scale space are then stored.

Local Description of the Interest Points

In the previous step, interest points detection is performed and their localization in the scale-space is stored. In this step, each interest point is characterized by computing a local descriptor. The descriptor must be both discriminant and invariant to a certain number of transformations. A discriminant descriptor is a descriptor which provides representative and different values for each different content. The description of an interest point must be independent from the description of other interest points. An efficient descriptor allows a correct matching in a large database of descriptors with high probability.

To compute a descriptor a circular neighborhood of radius β is considered in order to be invariant to rotation. The interest point orientation is computed, KO(x,y), by summing the gradient vectors in a small disc Disc(x,y) around the interest point.

$$KO(x, y) = \text{orientation}\left(\sum_{(x'',y'') \in Disc(x,y)} gradients(x'', y'')\right)$$

The orientation of the resulting vector gives the interest point orientation (FIG. 5).

FIG. 5 illustrates the computation of a interest point orientation at position (x,y), the disc radius β is chosen equal to 5 pixels.

The gradient of a pixel (x',y') is given by its magnitude and its orientation:

$$[MA1] \begin{vmatrix} \text{magnitude}(x'', y'') = \sqrt{(L_x(x'', y''))^2 + (L_y(x'', y''))^2} \\ \text{orientation}(x'', y'') = \text{Arctan}(L_y(x'', y'')/L_x(x'', y'')) \end{vmatrix}$$

Where $L_x$ and $L_y$ are the derivatives of the function L(x,y) with respect to x and y dimensions respectively. And where L(x,y) is the Gaussian image:

$$L(x,y,\sigma)=G(x,y,\sigma)*I(x,y)$$

According to the interest point orientation KO(x,y) defined previously, a neighboring disc of radius R (preferably equal to 20) centered on (x,y) is then divided into nine regions (FIG. 6). Each pixel (x',y') within the disc belongs to one unique region depending on its polar position θ relative to the interest point orientation and its distance r from the interest point (x,y). The nine regions are defined as follows (see the table below):

| Region | r = Distance to Keypoint (in pixels) | θ = Relative angle to KO (in degrees) |
| --- | --- | --- |
| R1 | [0; 8[ | any |
| R2 | [8; 14[ | [−45; 45[ |
| R3 | [15; 20[ | [−45; 45[ |
| R4 | [8; 14[ | [45; 135[ |
| R5 | [15; 20[ | [45; 135[ |
| R6 | [8; 14[ | [135; 225[ |
| R7 | [15; 20[ | [135; 225[ |
| R8 | [8; 14[ | [225; 315[ |
| R9 | [15; 20[ | [225; 315[ |

With:
KO the interest point orientation,
θ the polar position of the pixel (x",y") within the disc relatively to the interest point orientation,
r the distance from the interest point to the pixel (x",y").
For each of the nine regions, we compute a local histogram of the gradients orientations of sixteen bins.

$$Histo(i,\phi,k)=\#Pixel(x'',y'')|\text{orientation}(x'',y'')=\phi,(x'',y'') \in R(i,k)$$

With
k the selected interest point (x,y)
φ the pixel orientation (from 0° to 360° with a step angle of 22.5°, so there are 16 bins)
i the index of the selected region (from 1 to 9)

R(i,k) the region i of the disc centered in the selected interest point k

The final descriptor of an interest point k (KD) is the concatenation of the nine histograms.

$$KD(k)=[Histo(i,\varphi,k)]_{i=1\ldots9}$$

The Local Fingerprint of a stable frame i, called also shot fingerprint (SF), is the set of all KD:

$$SF(i)=\{KD(k)\}$$

The cardinality of SF(i) depends on image activity.

The Video Fingerprint VF is the set of shot fingerprints SF:

The invention claimed is:

1. Method for computing a fingerprint of a video sequence wherein it comprises the steps of
    Computation of a visual digest for each frame of the video,
    Computation of the distance between the visual digest of each frame of the video in order to detect shots,
    Detection, based on the visual digest, for each detected shot of the video, of a frame, called stable frame, having the smallest content variation of the shot,
    Detection of a set of interest points in said stable frame, said interest points being detected by applying a difference of Gaussian of successive filtered frames,
    Calculation of a local fingerprint, based on said interest points, for said stable frame.

2. Method according to claim 1 wherein the computation of a visual digest for each frame is based on the computation of a visual hash function.

3. Method according to claim 2 wherein the said visual hash function comprises the sub-steps of
    selection of a set of pixels, said set of pixels being the pixels belonging to the ellipse of maximum size centered in the center of the frame comprised in said frame,
    calculation of a visual digest for each angular orientation ($\theta$) from 0 to 179 degrees,
    the global visual digest of said frame being the set of all the visual digests of the different angular orientations.

4. Method according to claim 3 wherein the visual digest for one orientation is based on the luminance of the pixels in the strip of said orientation.

5. Method according to claim 3 wherein the step of detecting the shots comprise the sub-steps of:
    defining a pseudo-global threshold for each frame, computed on a large sliding window centered on said frame, based on the mean and on the variance of the distance between said frame (i) and the frames in said window,
    defining a local and adaptive threshold for each frame, computed on a small sliding window centered on said frame (i), based on the second maximum value of the distance between two frames in said window.

6. Method according to claim 5 wherein the shots are defined as being the frames which distance with their neighbor frame is lower than the maximum of the said two thresholds.

7. Method according to claim 6 wherein the step of detection of a stable frame comprises the sub-steps of:
    computing, for each frame of each shot, an average of the content image distance defined in an interval comprising a predetermined number of frames (2L3+1),
    determining the stable frame as being the frame verifying the following conditions:
        the said calculated distance is the minimum of the calculated distance
        the entropy of the visual digest of said frame is higher than a predetermined threshold.

8. Method according to claim 7 wherein the step of calculation of a local fingerprint for said stable frame comprises the sub-step of
    computation of a descriptor for each of the interest points.

9. Method according to claim 8 wherein the computation of a descriptor comprises the following sub-steps
    determining the gradient of each interest point orientation in a small disc around the interest point, by computing its magnitude and its orientation,
    division into nine regions of a circle centered around each interest point;
    computation for each region of a local histogram of the gradients orientation,
    the set of each local histogram representing the descriptor of each interest point.

10. Method according to claim 9 wherein the local fingerprint of a stable frame is the set of the descriptors of all the interest points of said stable frame.

11. Method according to claim 10 wherein the video fingerprint is the set of the local fingerprints of all the stable frames.

* * * * *